US009457654B2

(12) United States Patent
Anderson et al.

(10) Patent No.: US 9,457,654 B2
(45) Date of Patent: Oct. 4, 2016

(54) DRIVE AXLE SYSTEM

(71) Applicant: ArvinMeritor Technology, LLC, Troy, MI (US)

(72) Inventors: Craig Anderson, Rochester, MI (US); Dale Kwasniewski, Galesburg, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 14/600,125

(22) Filed: Jan. 20, 2015

(65) Prior Publication Data

US 2016/0207397 A1    Jul. 21, 2016

(51) Int. Cl.
*F16H 48/06* (2006.01)
*B60K 17/16* (2006.01)
*F16H 48/08* (2006.01)

(52) U.S. Cl.
CPC ............... *B60K 17/16* (2013.01); *F16H 48/08* (2013.01)

(58) Field of Classification Search
CPC .... B60K 17/16; B60K 17/348; B60K 17/36; B60K 2023/0858; F16H 48/08; F16H 48/06; F16H 48/20
See application file for complete search history.

(56) References Cited

U.S. PATENT DOCUMENTS

| 1,243,720 | A | 10/1917 | Eidson |
| 2,896,467 | A | 7/1959 | Saari |
| 2,973,660 | A | 3/1961 | Popper |
| 3,000,456 | A | 9/1961 | Christie |
| 3,213,700 | A | 10/1965 | Brownyer |
| 3,388,760 | A | 6/1968 | Christie |
| 3,645,153 | A | 2/1972 | Northcraft |
| 3,679,016 | A | 7/1972 | Bixby |
| 3,706,350 | A | 12/1972 | Bokovoy |
| 4,095,675 | A | 6/1978 | Bell |
| 4,207,780 | A | 6/1980 | Saxton |
| 4,651,587 | A | 3/1987 | Anderson et al. |
| 4,733,578 | A | 3/1988 | Glaze et al. |
| 4,754,847 | A | 7/1988 | Glaze et al. |
| 5,711,389 | A | 1/1998 | Schlosser |
| 6,569,053 | B2 | 5/2003 | Hirao et al. |
| 6,648,788 | B1 | 11/2003 | Sullivan |
| 6,705,965 | B2 | 3/2004 | Sullivan |
| 6,855,087 | B2 | 2/2005 | Chakraborty |
| 6,949,046 | B2 | 9/2005 | Bell |
| 6,991,571 | B2 | 1/2006 | Gady et al. |
| 7,866,433 | B2 | 1/2011 | Martin, III et al. |
| 8,398,520 | B1 | 3/2013 | Bassi et al. |

(Continued)

FOREIGN PATENT DOCUMENTS

EP    1231093 A2    8/2002

OTHER PUBLICATIONS

"Design Manual for Bevel Gears," ANSI/ALMA 2005-D03 (Revision of ANSI/ALMA 2005-C96), copyright 2003, American Gear Manufacturers Association, Alexandria, VA.

(Continued)

*Primary Examiner* — David J Hlavka
(74) *Attorney, Agent, or Firm* — Brooks Kushman P.C.

(57) ABSTRACT

A drive axle system that may have a first drive axle assembly and a second drive axle assembly. The first drive axle assembly may have a first pinion that may rotate about a first pinion axis. The second drive axle assembly may have a second pinion that may rotate about a second pinion axis. The first pinion axis may be disposed substantially parallel to the second pinion axis.

19 Claims, 3 Drawing Sheets

(56) References Cited

U.S. PATENT DOCUMENTS

| | | |
|---|---|---|
| 8,651,994 B2 | 2/2014 | Bassi et al. |
| 2002/0177501 A1 | 11/2002 | Turner et al. |
| 2003/0203783 A1* | 10/2003 | Sullivan ................. B60K 17/36 475/221 |
| 2006/0048856 A1 | 3/2006 | Li et al. |
| 2006/0089226 A1 | 4/2006 | Garcia et al. |
| 2006/0189431 A1 | 8/2006 | Selva, Jr. et al. |
| 2006/0272866 A1* | 12/2006 | Ziech ..................... B62D 61/10 180/24.1 |
| 2006/0276292 A1 | 12/2006 | Puiu |
| 2006/0276297 A1 | 12/2006 | Ziech |
| 2009/0277298 A1 | 11/2009 | Mayr |
| 2012/0021864 A1* | 1/2012 | Ziech ..................... B60K 17/16 475/225 |
| 2013/0074625 A1 | 3/2013 | Hirao et al. |
| 2013/0085031 A1 | 4/2013 | Bassi et al. |
| 2014/0057752 A1* | 2/2014 | Ziech ..................... B60K 17/16 475/221 |
| 2014/0274538 A1* | 9/2014 | Ziech ..................... B60K 17/36 475/198 |

OTHER PUBLICATIONS

"Calculating Instructions for the Gleason No. 70 Hypoid Generator," http://millfam.org/terry/1,Hypoid_Calculation_Instructions.pdf, date unknown.

Maintenance Manual MM-0250, Amboid Rear Differential Carrier, Revised 08-10, Meritor Heavy Vehicle Systems, LLC, Troy, MI.

European Patent Office, Extended European Search Report for the corresponding European Patent Application No. 15191303.5 dated Apr. 29, 2016.

Australian Government, Patent Examination Report No. 1 for the corresponding Australian Patent Application No. 2016200268 dated Jun. 10, 2016.

* cited by examiner

DRIVE AXLE SYSTEM

TECHNICAL FIELD

This patent application relates to a drive axle system that may have differently configured first and second drive axle assemblies.

BACKGROUND

A vehicle having a tandem axle configuration is disclosed in U.S. Pat. No. 8,651,994.

SUMMARY

In at least one embodiment, a drive axle system is provided. The drive axle system may have a first drive axle assembly and a second drive axle assembly. The first drive axle assembly may include an input shaft, an output shaft, a first ring gear, and a first pinion. The input shaft and the output shaft may rotate about a first axis. The first ring gear may rotate about a first ring gear axis and may provide torque to a first wheel axle. The first pinion may rotate about a first pinion axis and may be operatively connected to the input shaft and the first ring gear such that the first pinion may provide torque from the input shaft to the first ring gear. The second drive axle assembly may include a second ring gear and a second pinion. The second ring gear may rotate about a second ring gear axis and may provide torque to a second wheel axle. The second pinion may rotate about a second pinion axis and may be operatively connected to the output shaft. The second pinion may provide torque from the output shaft to the second ring gear. The first pinion axis may be disposed substantially parallel to the second pinion axis.

In at least one embodiment, a drive axle system is provided. The drive axle system may have a first drive axle assembly and a second drive axle assembly. The first drive axle assembly may include an input shaft, an output shaft, a drive gear, a first ring gear, a first pinion, and a driven gear. The input shaft and the output shaft may rotate about a first axis. The drive gear may be disposed on the input shaft. The first ring gear may rotate about a first ring gear axis and may provide torque to a first wheel axle. The first ring gear may have a first front surface and a first set of ring gear teeth that may be arranged around the first ring gear axis and that may extend away from the first front surface. The first pinion may rotate about a first pinion axis and may provide torque to the first ring gear. The driven gear may be disposed on the first pinion and may engage the drive gear. The second drive axle assembly may include a second ring gear and a second pinion. The second ring gear may rotate about a second ring gear axis and may provide torque to a second wheel axle. The second ring gear may have a second front surface and a second set of ring gear teeth that may be arranged around the second ring gear axis and may extend away from the second front surface. The second pinion may rotate about a second pinion axis and may be operatively connected to the output shaft. The second pinion may provide torque from the output shaft to the second ring gear. The first front surface of the first ring gear may face toward the second front surface of the second ring gear.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
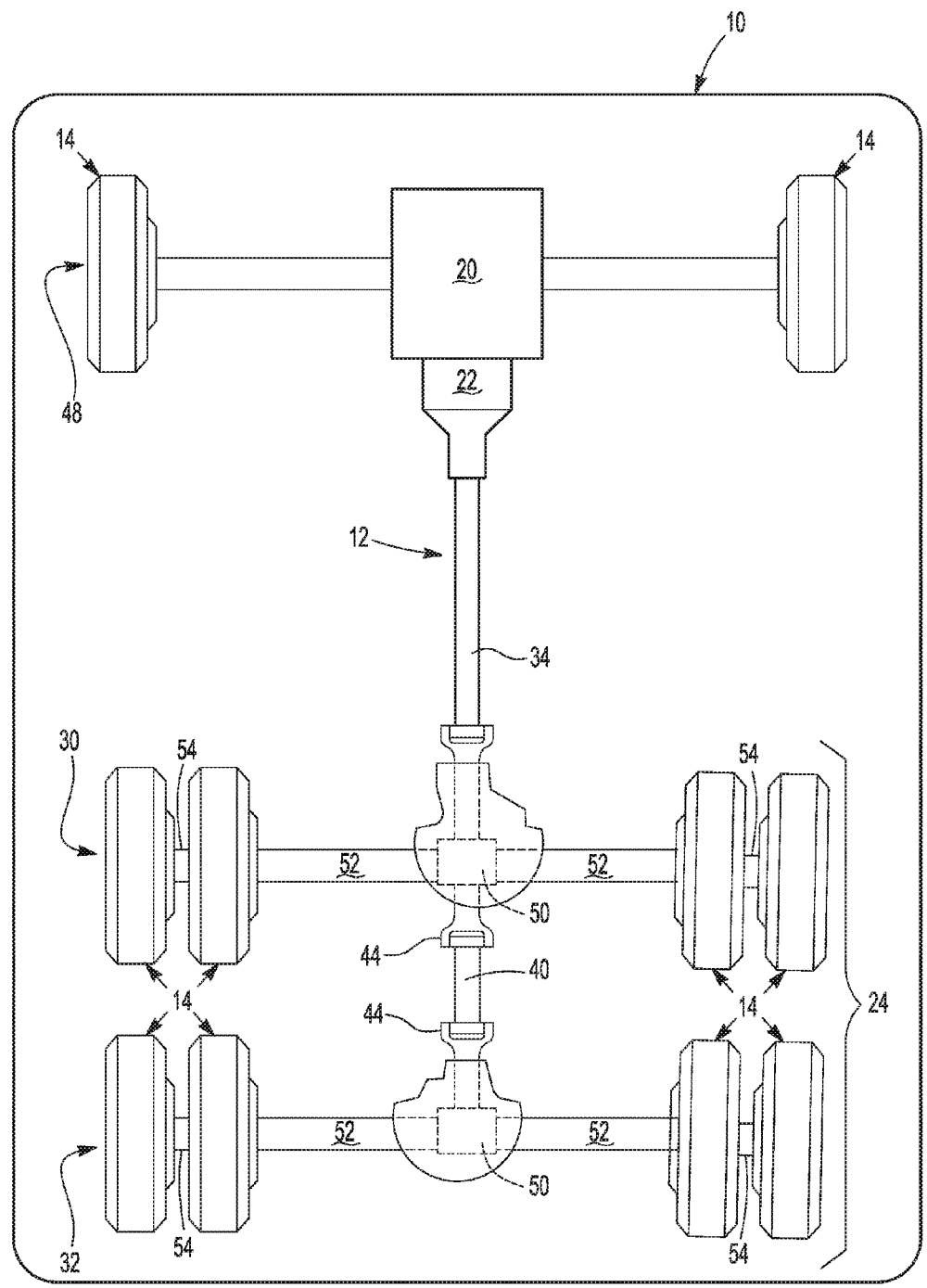
FIG. 1 is a schematic of an exemplary vehicle having a drive axle system.

Referring to FIG. 1, an exemplary vehicle 10 is shown. The vehicle 10 may be a motor vehicle like a truck, farm equipment, military transport or weaponry vehicle, or cargo loading equipment for land, air, or marine vessels. The vehicle 10 may include a trailer for transporting cargo in one or more embodiments.

The vehicle 10 may have a drivetrain 12 that may provide torque to one or more wheel assemblies 14 to propel the vehicle 10. The drivetrain 12 may have a hybrid configuration that may employ multiple power sources or a non-hybrid configuration. In a non-hybrid configuration, the drivetrain 12 may include an engine 20, a transmission 22, and a drive axle system 24.

The engine 20 may provide power that may be used to rotate one or more wheel assemblies 14. For example, the vehicle 10 may have a set of wheel assemblies 14 that may include a tire mounted on a wheel. In at least one embodiment, the engine 20 may be configured as an internal combustion engine that may be adapted to combust any suitable type of fuel, such as gasoline, diesel fuel, or hydrogen.

The transmission 22 may be coupled to and may be driven by the engine 20. The transmission 22 may be of any suitable type, such as a multi-gear "step ratio" transmission as is known by those skilled in the art.

The drive axle system 24 may include a plurality of drive axle assemblies. Each drive axle assembly may rotatably support and may provide torque to one or more wheel assemblies 14. In FIG. 1, a first drive axle assembly 30 and a second drive axle assembly 32 are shown in a tandem axle configuration, although it is contemplated that a greater number of drive axle assemblies may be provided. In a tandem configuration, the first drive axle assembly 30 may be connected in series with the second drive axle assembly 32. The first drive axle assembly 30 may be referred to as a forward-rear drive axle assembly. The second drive axle assembly 32 may be referred to as a rear-rear drive axle assembly. An output of the transmission 22 may be coupled to an input of the first drive axle assembly 30 with a drive shaft 34.

Figure 3:
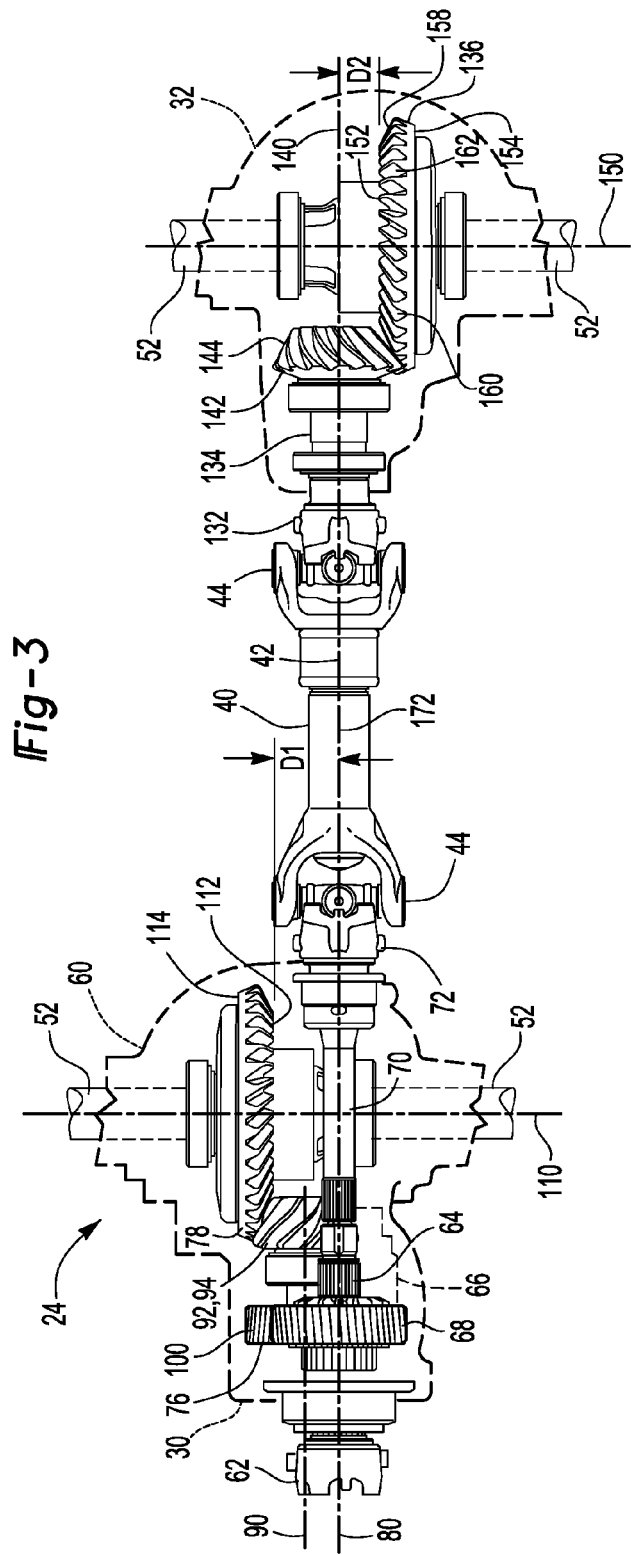
FIG. 3 is a top view of the drive axle system of FIG. 2.

An output of the first drive axle assembly 30 may be coupled to an input of the second drive axle assembly 32 via a prop shaft 40. As is best shown in FIG. 3, the prop shaft 40 may extend along and may rotate about a prop shaft axis 42. The prop shaft 40 may be coupled to an output of the first drive axle assembly 30 and an input of the second drive axle assembly 32 at opposing ends via couplings 44, such as universal joints, that may allow the first drive axle assembly 30 to move with respect to the second drive axle assembly 32 while allowing the prop shaft 40 to rotate about the prop shaft axis 42.

The vehicle 10 may also include a front axle assembly 48 that may be configured to steer the vehicle 10. The front axle assembly 48 may or may not be configured as a drive axle that provides torque to at least one associated wheel assembly 14.

The first drive axle assembly 30 and the second drive axle assembly 32 may each have a differential 50. The differential 50 may receive torque from the engine 20 and transmission 22 and may transmit torque to a wheel assembly 14 via an associated wheel axle 52. Each wheel axle 52 may interconnect the differential 50 to at least one associated wheel hub assembly 54. In FIG. 1, two wheel axles 52 are provided with the first drive axle assembly 30 and with the second drive axle assembly 32 that extend from opposite sides of a corresponding differential 50. In at least one embodiment, a wheel axle 52 may be coupled to an output of the differential 50 at a first end and may be coupled to a corresponding wheel hub assembly 54 at a second end.

The wheel hub assembly 54 may facilitate coupling of a wheel assembly 14 to a wheel axle 52. For example, a wheel assembly 14 may be mounted on and may rotate with the wheel hub assembly 54 and a corresponding wheel axle 52.

Figure 2:
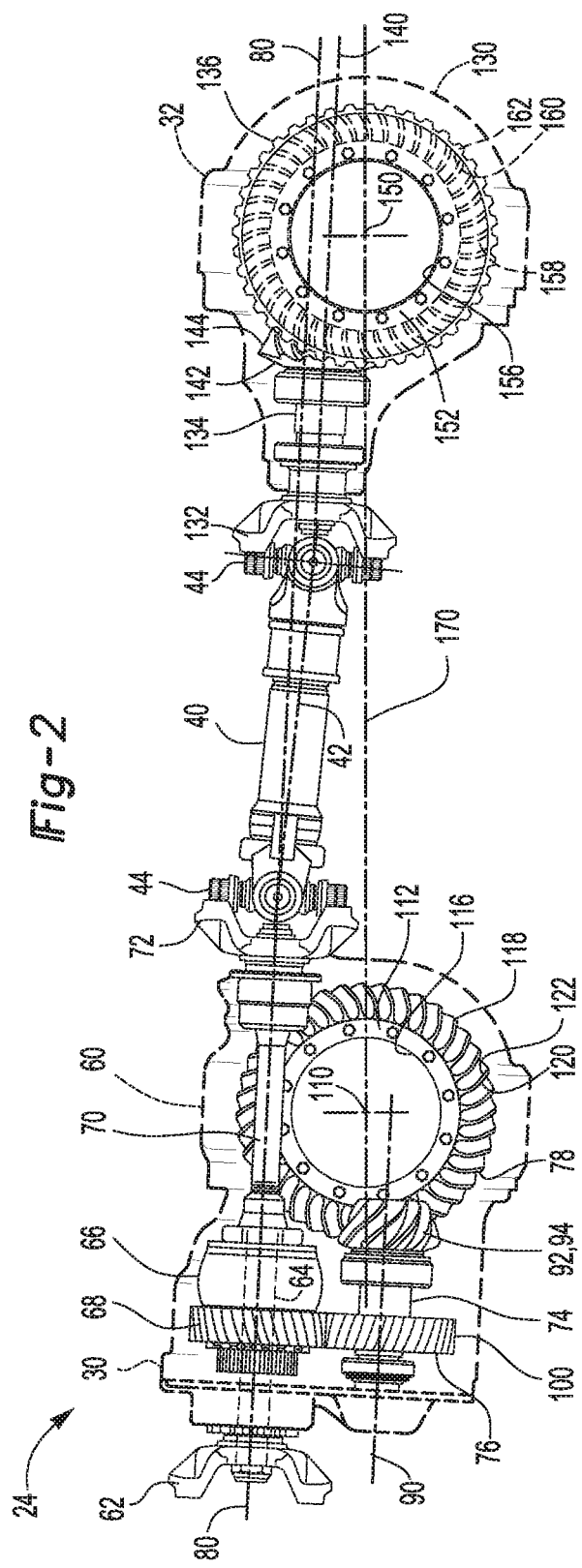
FIG. 2 is a side view of a drive axle system having a first drive axle assembly and a second drive axle assembly.

Referring to FIGS. 2 and 3, the first drive axle assembly 30 and the second drive axle assembly 32 are shown in more detail.

The first drive axle assembly 30 may be configured to provide torque to its associated wheel assemblies 14 via its wheel axles 52 and to provide torque to the second drive axle assembly 32. In at least one embodiment, the first drive axle assembly 30 may include a housing 60, an input yoke 62, an input shaft 64, an interaxle differential unit 66, a drive gear 68, an output shaft 70, an output yoke 72, a first pinion 74, a driven gear 76, and a first ring gear 78.

The housing 60 may receive various components of the first drive axle assembly 30. In addition, the housing 60 may facilitate mounting of the first drive axle assembly 30 to the vehicle 10.

The input yoke 62 may facilitate coupling of the first drive axle assembly 30 to the drive shaft 34. The input yoke 62 may have any suitable configuration and may be part of a coupling 44 or universal joint. The input yoke 62 may also be fixedly coupled to the input shaft 64. For instance, the input yoke 62 may include a center bore that may receive an end portion of the input shaft 64. The center bore and the input shaft 64 may be provided with mating splines that may help align and secure the input yoke 62 to the input shaft 64. A fastener, such as a nut, may be threaded onto an end of the input shaft 64 to further secure and inhibit removal of the input yoke 62 from the input shaft 64.

The input shaft 64 may be configured to rotate about a first axis 80. For instance, the input shaft 64 may be supported by one or more bearings that may be disposed in the housing 60. The bearings may cooperate to facilitate rotation of the input shaft 64 about the first axis 80 while inhibiting axial movement of the input shaft 64 along the first axis 80. The input shaft 64 and the first axis 80 may be located above the first pinion 74. The input shaft 64 may be coupled to and may provide torque to the interaxle differential unit 66.

The interaxle differential unit 66 may be configured to compensate for speed differences between the first axle assembly 30 and the second axle assembly 32. The interaxle differential unit 66 may be disposed in the housing 60 proximate the input shaft 64. An abbreviated discussion of one example of an interaxle differential unit 66 known to those skilled in the art is provided for illustration purposes. In this example, the interaxle differential unit 66 may include a case that may receive an output gear, a spider, and at least one pinion gear. The output gear may be disposed on or may be operatively connected to the output shaft 70 and may rotate with the output shaft 70 about the first axis 80. The spider may be fixedly disposed on the input shaft 64 and may rotatably support one or more pinion gears. The case may receive the spider such that the case and spider may rotate together about the first axis 80. The pinion gear(s) of the interaxle differential unit 66 may include gear teeth that mate with the output gear and with the drive gear 68, such a via gear teeth that may be arranged on a side or face of the drive gear 68 that faces toward the interaxle differential unit 66. An interaxle differential lock may be provided to lock or unlock the interaxle differential unit 66. The interaxle differential lock and may engage the case to inhibit the input shaft 64 and the output shaft 70 from rotating at different rotational velocities and may disengage the case to allow the output gear and output shaft 70 to rotate at a different rotational velocity than the input gear and input shaft 64.

The drive gear 68 may be disposed proximate or may be disposed on the input shaft 64. For example, the drive gear 68 may have a hole through which the input shaft 64 may extend. The drive gear 68 may rotate about or with respect to the input shaft 64 and the first axis 80 under certain operating conditions. The drive gear 68 may include a plurality of teeth 86 that may be arranged around an outside circumference of the drive gear 68.

The output shaft 70 may extend along and may be configured to rotate about the first axis 80. For instance, the output shaft 70 may be supported by one or more bearings that may be disposed on the housing 60. The bearings may facilitate rotation of the output shaft 70 while inhibiting axial movement of the output shaft 70 along the first axis 80. The output shaft 70 may be coupled to the interaxle differential unit 66. For instance, the output shaft 70 may be coupled to an output gear of the interaxle differential unit 66.

The output yoke 72 may facilitate coupling of the first drive axle assembly 30 to the prop shaft 40. The output yoke 72 may have any suitable configuration and may be part of a coupling 44 or universal joint. The output yoke 72 may be fixedly coupled to the output shaft 70. For instance, the output yoke 72 may include a center bore that may receive an end of the output shaft 70. The center bore and the output shaft 70 may be provided with mating splines that may help align and secure the output yoke 72 to the output shaft 70. A fastener, such as a nut, may be threaded onto an end of the output shaft 70 to further secure and inhibit removal of the output yoke 72 from the output shaft 70.

The first pinion 74 may be spaced apart from the input shaft 64 and may be configured to rotate about a first pinion axis 90. For instance, the first pinion 74 may be supported by one or more bearings that may be disposed in the housing 60 that may facilitate rotation of the first pinion 74 while inhibiting axial movement of the first pinion 74 along the first pinion axis 90. In at least one embodiment, the first axis 80 and the first pinion axis 90 may be spaced apart and extend substantially parallel to each other.

The first pinion 74 may include a first pinion gear 92 that may be disposed at an end of the first pinion 74. The first pinion gear 92 may be integrally formed with the first pinion 74 and may generally have a tapered conical configuration that may become progressively narrower or become closer to the first pinion axis 90 in a direction that extends away from the driven gear 76 and toward the end of the first pinion 74 that is disposed proximate the first ring gear 78. The first pinion gear 92 may include a first set of pinion gear teeth 94 that mate with corresponding ring gear teeth on the first ring gear 78. The first set of pinion gear teeth 94 may be arranged around the first pinion axis 90 and may have a spiral or hypoid configuration. Each member of the first set of pinion gear teeth 94 may have a common or substantially identical configuration. For instance, each pinion gear tooth 94 may extend along an arc or spiral with respect to the first pinion axis 90. In addition, each pinion gear tooth 94 may have a convex side 96 and a concave side 98 that may be disposed opposite the convex side 96.

The first pinion 74 may be operatively connected to the input shaft 64 and the first ring gear 78. For example, the first pinion 74 may be operatively connected to the input shaft 64 via the interaxle differential unit 66, the drive gear 68, and the driven gear 76 and may engage the first ring gear 78. As such, the first pinion 74 may provide or transmit torque from the input shaft 64 to the first ring gear 78.

The driven gear 76 may be disposed proximate or may be disposed on the first pinion 74. For example, the driven gear 76 may have a hole through which the first pinion 74 may extend. The driven gear 76 may include a plurality of teeth 100 that may be generally arranged about an outside circumference of the driven gear 76 that may engage and mate with the set of teeth 86 of the drive gear 68.

The first ring gear 78 may be configured to rotate about a first ring gear axis 110. The first ring gear axis 110 may be disposed proximate the center of the first ring gear 78. The first ring gear 78 may be operatively connected to and may provide torque to one or more wheel axles 52 of the first drive axle assembly 30. For example, the first ring gear 78 may be part of the differential 50 of the first drive axle assembly 30 and may be directly or indirectly connected to a wheel axle 52 of the first drive axle assembly 30. The first pinion 74 and/or first pinion axis 90 may be positioned below the first ring gear axis 110. Moreover, the input shaft 64, the drive gear 68, the output shaft 70 and other components disposed along the first axis 80 may be positioned above the first pinion 74, the first pinion axis 90, and the first ring gear axis 110 in one or more embodiments. This "high entry" configuration may position these components above lubricant that may accumulate in the bottom of the housing 60, thereby reducing or avoiding frictional drag with the lubricant that may otherwise reduce operational efficiency of the first drive axle assembly 30. In at least one embodiment, the first ring gear 78 may include a first front surface 112, a first back surface 114, a first hole 116, and a first set of ring gear teeth 118.

The first front surface 112 may extend around the first ring gear axis 110. As is best shown in FIG. 3, the first front surface 112 may be substantially planar and may be disposed substantially perpendicular to the first ring gear axis 110. The first front surface 112 may extend radially outward from the first hole 116 to the first set of ring gear teeth 118. Moreover, the first front surface 112 may extend around and may at least partially define the first hole 116 or an opening of the first hole 116.

The first back surface 114 may be disposed opposite the first front surface 112. As such, the first back surface 114 may be completely spaced apart from the first front surface 112. In at least one embodiment, the first back surface 114 may be substantially planar and may be disposed substantially perpendicular to the first ring gear axis 110. The first back surface 114 may also be disposed substantially parallel to the first front surface 112.

The first hole 116 may extend from the first front surface 112 to the first back surface 114. The first hole 116 may extend along and may be centered about the first ring gear axis 110. As such, an inside circumference of the first ring gear 78 may at least partially define the first hole 116. The first hole 116 may be configured to receive another component, such as a portion of the wheel axle 52. The first hole 116 may be spaced apart from the first set of ring gear teeth 118 to help strengthen the first ring gear 78.

The first set of ring gear teeth 118 may be arranged around the first hole 116. For example, the first set of ring gear teeth 118 may be arranged around the first hole 116 and the first ring gear axis 110 such that the first front surface 112 may be disposed between and may separate each ring gear tooth 118 from the first hole 116. Each member of the first set of ring gear teeth 118 may have a common or substantially identical configuration. For instance, each ring gear tooth 118 may have a spiral configuration or a helical configuration that may extend at an angle with respect to the first front surface 112. As such, each ring gear tooth 118 may extend along a curved path (e.g., helical or spiral path) away from the first ring gear axis 110, and may extend away from the first front surface 112 toward the first back surface 114. In addition, each ring gear tooth 118 may have a convex side 120 and a concave side 122 that may be disposed opposite the convex side 120. The first set of pinion gear teeth 94 may engage the convex side 120 of the first set of ring gear teeth 118 when the first pinion 74 rotates the first ring gear 78.

The second drive axle assembly 32 may be configured to provide torque to its associated wheel assemblies 14 via its wheel axles 52. In at least one embodiment, the second drive axle assembly 32 may include a housing 130, an input yoke 132, a second pinion 134, and a second ring gear 136.

The housing 130 may receive various components of the second drive axle assembly 32. In addition, the housing 130 may facilitate mounting of the second drive axle assembly 32 to the vehicle 10.

The input yoke 132 may facilitate coupling of the second drive axle assembly 32 to the prop shaft 40. The input yoke 132 may have any suitable configuration and may be part of a coupling 44 or universal joint. The input yoke 132 may also be fixedly coupled to the second pinion 134. For instance, the input yoke 132 may include a center bore that may receive an end portion of the second pinion 134. The center bore and the second pinion 134 may be provided with mating splines that may help align and secure the input yoke 132 to the second pinion 134. A fastener, such as a nut, may be threaded onto an end of the second pinion 134 to further secure and inhibit removal of the input yoke 132 from the second pinion 134.

The second pinion 134 may be operatively connected to the output shaft 70 via the prop shaft 40 and may provide or transmit torque from the output shaft 70 and prop shaft 40 to the second ring gear 136. The second pinion 134 may be configured to rotate about a second pinion axis 140. For instance, the second pinion 134 may be supported by one or more bearings that may be disposed in the housing 130 that may facilitate rotation of the second pinion 134 while inhibiting axial movement of the second pinion 134 along the second pinion axis 140. In at least one embodiment, the first pinion axis 90 and the second pinion axis 140 may be spaced apart and extend substantially parallel to each other. In addition, the second pinion axis 140 may be spaced apart from and disposed substantially parallel to the first axis 80; however, the second pinion axis 140 may not be coaxially disposed with the first axis 80. In addition, the first axis 80 and the second pinion axis 140 may not be coaxially disposed with or extend substantially parallel to the prop shaft axis 42 as is best shown in FIG. 2.

The second pinion 134 may include a second pinion gear 142 that may be disposed at an end of the second pinion 134. The second pinion gear 142 may be integrally formed with the second pinion 134 and may generally have a tapered conical configuration that may become progressively narrower or become closer to the second pinion axis 140 in a direction that extends away from the input yoke 132 and toward the end of the second pinion 134 that is disposed proximate the second ring gear 136. The second pinion gear 142 may include a second set of pinion gear teeth 144 that mate with corresponding teeth on the second ring gear 136. The second set of pinion gear teeth 144 may be arranged around the second pinion axis 140 and may have a spiral or hypoid configuration. Each member of the second set of pinion gear teeth 144 may have a common or substantially identical configuration. For instance, each pinion gear tooth 144 may extend along an arc or spiral with respect to the second pinion axis 140. In addition, each pinion gear tooth 144 may have a convex side 146 and a concave side 148 that may be disposed opposite the convex side 146.

The second ring gear 136 may be configured to rotate about a second ring gear axis 150. The second ring gear axis 150 may be disposed proximate the center of the second ring gear 136. The second ring gear 136 may be operatively connected to and may provide torque to one or more wheel axles 52 of the second drive axle assembly 32. For example, the second ring gear 136 may be part of the differential 50 of the second drive axle assembly 32 and may be directly or indirectly connected to a wheel axle 52 of the second drive axle assembly 32. The second pinion 134 and/or second pinion axis 140 may be positioned above the second ring gear axis 150. Moreover, the second pinion axis 140 may be disposed substantially parallel to the first axis 80 and the first pinion axis 90. In at least one embodiment, the second ring gear 136 may include a second front surface 152, a second back surface 154, a second hole 156, and a second set of ring gear teeth 158.

The second front surface 152 may extend around the second ring gear axis 150. As is best shown in FIG. 3, the second front surface 152 may be substantially planar and may be disposed substantially perpendicular to the second ring gear axis 150. The second front surface 152 may extend radially outward from the second hole 156 to the second set of ring gear teeth 158. Moreover, the second front surface 152 may extend around and may at least partially define the second hole 156 or an opening of the second hole 156.

The second back surface 154 may be disposed opposite the second front surface 152. As such, the second back surface 154 may be completely spaced apart from the second front surface 152. In at least one embodiment, the second back surface 154 may be substantially planar and may be disposed substantially perpendicular to the second ring gear axis 150. The second back surface 154 may also be disposed substantially parallel to the second front surface 152.

The second hole 156 may extend from the second front surface 152 to the second back surface 154. The second hole 156 may extend along and may be centered about the second ring gear axis 150. As such, an inside circumference of the second ring gear 136 may at least partially define the second hole 156. The second hole 156 may be configured to receive another component, such as a portion of the wheel axle 52. The second hole 156 may be spaced apart from the second set of ring gear teeth 158 to help strengthen the second ring gear 136.

The second set of ring gear teeth 158 may be arranged around the second hole 156. For example, the second set of ring gear teeth 158 may be arranged around the second hole 156 and around the second ring gear axis 150 such that the second front surface 152 may be disposed between and may separate each ring gear tooth 158 from the second hole 156. Each member of the second set of ring gear teeth 158 may have a common or substantially identical configuration. For instance, each ring gear tooth 158 may have a spiral configuration or a helical configuration that may extend at an angle with respect to the second front surface 152. As such, each ring gear tooth 158 may extend along a curved path (e.g., helical or spiral path) away from the second ring gear axis 150, and may extend away from the second front surface 152 toward the second back surface 154. In addition, each ring gear tooth 158 may have a convex side 160 and a concave side 162 that may be disposed opposite the convex side 160. The second set of pinion gear teeth 144 may engage the convex side 160 of the second set of ring gear teeth 158 when the second pinion 134 rotates the second ring gear 136.

As shown in FIGS. 2 and 3, the first drive axle assembly 30 and the second drive axle assembly 32 have different pinion and ring gear configurations. More specifically, the first and second pinions 74, 134 may have different configurations and the first and second ring gears 78, 136 may have different configurations. The different configurations result in different structural, operational, and performance characteristics between the first drive axle assembly 30 and the second drive axle assembly 32. In addition, these differences allow the first pinion 74 and the second pinion 134 to be disposed substantially parallel to each other (i.e., the first pinion axis 90 may be disposed substantially parallel to the second pinion axis 140, but not coaxial with the second pinion axis 140), which may help reduce noise, vibration, and harshness (NVH) and may provide other advantages or benefits as will be discussed in more detail below. Such a configuration may allow the second axle assembly 32 to achieve faster gear ratios and improved gear operating efficiency.

The different gear configurations of the first drive axle assembly 30 in the second drive axle assembly 32 may result in a drive axle system 24 in which the first ring gear 78 and the second ring gear 136 are disposed on opposite sides of the first plane 172. Other associated structural characteristics and differences between the first drive axle assembly 30 and the second drive axle assembly 32 may be better understood with reference to different planes that may be associated with different rotational axes of the drive axle system 24.

Referring to FIG. 2, the first ring gear axis 110 and the second ring gear axis 150 may be disposed along a substantially horizontal axis or may be disposed in in a substantially horizontal plane 170 when the first drive axle assembly 30 and the second drive axle assembly 32 are in nominal design positions, such as when the first ring gear axis 110 and second ring gear axis 150 are disposed substantially equal distances from a vehicle chassis. The first pinion axis 90 and the second pinion axis 140 may not be disposed parallel to the horizontal plane 170. For example, the first pinion axis 90 and the second pinion axis 140 may be disposed at an angle of about 3-5° respect to the horizontal plane 170 in one or more embodiments.

Referring to FIG. 3, the first axis 80 and the second pinion axis 140 may be disposed in a first plane 172. The first plane 172 may be disposed substantially perpendicular to the first ring gear axis 110 and the second ring gear axis 150 and may extend in a generally vertical direction. Although the first axis 80 and the second pinion axis 140 may be disposed in the first plane 172, the first axis 80 in the second pinion axis 140 may not be coaxially disposed as is best shown in FIG. 2.

Referring to FIG. 2, relative positioning of axes associated with the first drive axle assembly 30 and the second drive axle assembly 32 in a vertical direction is best shown. These axes relationships may result from the different pinion and ring gear configurations employed in the first drive axle assembly 30 and the second drive axle assembly 32.

Regarding the first drive axle assembly 30, the first axis 80 may be disposed above the first pinion axis 90 and the first ring gear axis 110. The first ring gear axis 110 may be disposed below the first axis 80 and may be disposed above the first pinion axis 90.

Regarding the second drive axle assembly 32, the second pinion axis 140 may be disposed above the second ring gear axis 150.

Regarding the first drive axle assembly 30 and the second drive axle assembly 32 in combination, the first axis 80 may be disposed above the second pinion axis 140 and hence above the second ring gear axis 150. The second pinion axis 140 may be disposed below the first axis 80 and may be disposed above the first pinion axis 90.

Referring to FIG. 3, relative positioning of axes associated with the first drive axle assembly 30 and the second drive axle assembly 32 in a lateral or horizontal direction is shown.

Regarding the first drive axle assembly 30, the first axis 80 may be disposed in the first plane 172. The first pinion axis 90 may be offset from and may not be disposed in the first plane 172. Instead, the first pinion axis 90 may be disposed between the first plane 172 and the first front surface 112 of the first ring gear 78. The first front surface 112 of the first ring gear 78 may face toward first plane 172 and may be completely spaced apart from the first plane 172. The first front surface 112 of the first ring gear 78 may be disposed at a first distance D1 from the first plane 172.

Regarding the second drive axle assembly 32, the second pinion axis 140 may be disposed in the first plane 172. The second front surface 152 of the second ring gear 136 may face toward the first plane 172 and may be completely spaced apart from the first plane 172. The second front surface 152 may be disposed at a second distance D2 from the first plane 172.

Regarding the first drive axle assembly 30 and the second drive axle assembly 32 in combination, the first axis 80, the prop shaft axis 42, and the second pinion axis 140 may be coplanar and may be disposed in the first plane 172. In addition, prop shaft axis 42 may intersect and may not be disposed parallel to the first axis 80 and the second pinion axis 140 as is best shown in FIG. 2. Referring to FIG. 3, the first axis 80 and the second pinion axis 140 may not be coplanar with the first pinion axis 90. The first front surface 112 and the second front surface 152 may be disposed on opposite sides of the first plane 172 and may be disposed substantially parallel to each other. The first front surface 112 of the first ring gear 78 may be disposed further from the first plane 172 than the second front surface 152 of the second ring gear 136 (D1>D2). The first back surface 114 of the first ring gear 78 may be disposed further from the first plane 172 than the second back surface 154 of the second ring gear 136.

In at least one embodiment, the first set of pinion teeth 94 of the first pinion gear 92 may be provided with a right-hand spiral while the first set of ring gear teeth 118 of the first ring gear 78 may be provided with a left-hand spiral. Such a configuration may position the first set of ring gear teeth 118 at least partially below the horizontal plane 170. The second set of pinion gear teeth 144 may be provided with a left-hand spiral while the second set of ring gear teeth 158 of the second ring gear 136 may be provided with a right-hand spiral. Such a configuration may allow the second set of pinion gear teeth 144 to be at least partially disposed above the horizontal plane 170. Positioning the second set of pinion gear teeth 144 at least partially above the horizontal plane 170 or wheel axle centerline may improve alignment between the output shaft 70 of the first drive axle assembly 30 and the input or second pinion 134 of the second drive axle assembly 32. Moreover, the second drive axle assembly 32 may be able to achieve faster gear ratios within an existing housing 130 or within the same package space as traditional drive axle designs. As such, the cost, complexity, and/or packaging issues that may be associated with a new housing design may be avoided. In addition, the second drive axle assembly 32 may have a more durable design in which stress and/or load forces on the differential case, bearings, pinion gear teeth 144 and/or ring gear teeth 158 may be reduced as compared to using gear teeth configurations like those of the first drive axle assembly 30 in which the pinion gear teeth exert force on the concave side of the ring gear teeth.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A drive axle system comprising:
   a first drive axle assembly that includes:
     an input shaft and an output shaft that rotate about a first axis;
     a first ring gear that rotates about a first ring gear axis and provides torque to a first wheel axle; and
     a first pinion that rotates about a first pinion axis and that is operatively connected to the input shaft and the first ring gear such that the first pinion provides torque from the input shaft to the first ring gear; and
   a second drive axle assembly that includes:
     a second ring gear that rotates about a second ring gear axis and provides torque to a second wheel axle; and
     a second pinion that rotates about a second pinion axis and that is operatively connected to the output shaft, wherein the second pinion provides torque from the output shaft to the second ring gear;
   wherein the first pinion axis is disposed parallel to the second pinion axis, the first axis is coplanar with the second pinion axis, and the first axis and the second pinion axis are not coplanar with the first pinion axis.

2. The drive axle system of claim 1 wherein the first axis is disposed parallel to the first pinion axis and the second pinion axis.

3. The drive axle system of claim 2 wherein the second pinion axis is not coaxially disposed with the first axis.

4. The drive axle system of claim 1 wherein the first ring gear has a first front surface that faces toward the first pinion and a first set of ring gear teeth that are arranged around the first ring gear axis and extend away from first ring gear axis and extend away from the first front surface.

5. The drive axle system of claim 1 wherein the second pinion axis is disposed below the first axis and disposed above the first pinion axis.

6. The drive axle system of claim 5 wherein the first ring gear axis is disposed below the first axis and disposed above the first pinion axis.

7. The drive axle system of claim 1 wherein the second pinion axis is disposed above the second ring gear axis.

8. The drive axle system of claim 7 wherein the first pinion axis is disposed below the first ring gear axis.

9. The drive axle system of claim 8 wherein the first axis is disposed above the first pinion axis, the second pinion axis, the first ring gear axis, and the second ring gear axis.

10. A drive axle system comprising:
   a first drive axle assembly that includes:
      an input shaft and an output shaft that rotate about a first axis;
      a drive gear that is disposed on the input shaft;
      a first ring gear that rotates about a first ring gear axis and provides torque to a first wheel axle, wherein the first ring gear has a first front surface and a first set of ring gear teeth that are arranged around the first ring gear axis and extend away from the first front surface;
      a first pinion that rotates about a first pinion axis and that provides torque to the first ring gear; and
      a driven gear that is disposed on the first pinion and that engages the drive gear; and
   a second drive axle assembly that includes:
      a second ring gear that rotates about a second ring gear axis and provides torque to a second wheel axle, wherein the second ring gear has a second front surface and a second set of ring gear teeth that are arranged around the second ring gear axis and extend away from the second front surface; and
      a second pinion that rotates about a second pinion axis and that is operatively connected to the output shaft, wherein the second pinion provides torque from the output shaft to the second ring gear;
   wherein the first front surface faces toward the second front surface.

11. The drive axle system of claim 10 wherein the first pinion axis is disposed parallel to the second pinion axis.

12. The drive axle system of claim 11 wherein the first axis and the second pinion axis are disposed in a first plane and wherein the first front surface and the second front surface both face toward the first plane.

13. The drive axle system of claim 12 wherein the first plane is disposed perpendicular to the first ring gear axis and the second ring gear axis.

14. The drive axle system of claim 12 wherein the first front surface and the second front surface are completely spaced apart from the first plane.

15. The drive axle system of claim 14 wherein the first front surface and the second front surface are disposed on opposite sides of the first plane and are disposed parallel to each other.

16. The drive axle system of claim 15 wherein the first pinion axis is disposed between the first plane and the first front surface.

17. The drive axle system of claim 16 wherein the first ring gear has a first back surface that is disposed opposite the first front surface and the second ring gear has a second back surface that is disposed opposite the second front surface, wherein the first back surface is disposed further from the first plane than the second back surface.

18. The drive axle system of claim 11 wherein each member of the first set of ring gear teeth has a convex side and a concave side disposed opposite the convex side and the first pinion has a first set of pinion gear teeth, wherein the first set of pinion gear teeth engage the convex side of the first set of ring gear teeth.

19. The drive axle system of claim 18 wherein each member of the second set of ring gear teeth has a convex side and a concave side disposed opposite the convex side and the second pinion has a second set of pinion gear teeth, wherein the second set of pinion gear teeth engage the convex side of the second set of ring gear teeth.

* * * * *